(12) United States Patent
Pelzer et al.

(10) Patent No.: US 11,659,957 B2
(45) Date of Patent: May 30, 2023

(54) PORTABLE HAND-HELD DEVICE FOR ACCOMMODATING AND TRANSPORTING FOOD OR A BEVERAGE AND METHOD FOR CONTROLLING TEMPERATURE

(71) Applicant: Frank Pelzer, Templin (DE)

(72) Inventors: Frank Pelzer, Templin (DE); Matthias Amrein, Calgary (CA); Moritz Reinders, Calgary (CA)

(73) Assignee: Frank Pelzer, Templin (DE)

( * ) Notice: Subject to any disclaimer, the term of this patent is extended or adjusted under 35 U.S.C. 154(b) by 0 days.

(21) Appl. No.: 16/342,925

(22) PCT Filed: Oct. 16, 2017

(86) PCT No.: PCT/DE2017/100878
§ 371 (c)(1),
(2) Date: Apr. 17, 2019

(87) PCT Pub. No.: WO2018/072787
PCT Pub. Date: Apr. 26, 2018

(65) Prior Publication Data
US 2020/0054171 A1    Feb. 20, 2020

(30) Foreign Application Priority Data
Oct. 17, 2016    (DE) .................. 10 2016 012 323.0

(51) Int. Cl.
| | | |
|---|---|---|
| *A47J 41/00* | (2006.01) | |
| *A47J 36/30* | (2006.01) | |
| *A47J 41/02* | (2006.01) | |

(52) U.S. Cl.
CPC .......... *A47J 41/0044* (2013.01); *A47J 36/30* (2013.01); *A47J 41/022* (2013.01)

(58) Field of Classification Search
CPC .... A47J 41/00; A47J 41/0038; A47J 41/0044; A47J 41/005; A47J 41/0061;
(Continued)

(56) References Cited

U.S. PATENT DOCUMENTS

| | | | | |
|---|---|---|---|---|
| 3,205,678 A | * | 9/1965 | Stoner ....................... | F25D 3/08 62/457.4 |
| 4,653,469 A | * | 3/1987 | Miyaji .................. | A47J 27/002 126/390.1 |

(Continued)

FOREIGN PATENT DOCUMENTS

| | | |
|---|---|---|
| CN | 2691425 Y | 4/2005 |
| CN | 203539086 U | 4/2014 |

(Continued)

OTHER PUBLICATIONS

CN2691425Y machine translation, originally published Mar. 13, 2005 (Year: 2005).*

(Continued)

*Primary Examiner* — Erik Kashnikow
*Assistant Examiner* — Bryan Kim (57) ABSTRACT

The invention relates to a portable hand-held device for accommodating and transporting food or a beverage, having a thermally insulated container (2), which is intended to accommodate food or a beverage in an accommodating space (7) and which has an inner and an outer wall (8), and an insulating space (9) arranged therebetween, enclosing the accommodating space, the insulating space being of closed and sealed design and having been evacuated; and having a container closure (3), which is intended to close a container opening (4) of the thermally insulated container (2), wherein the insulating space (9) contains a working medium (11) which, by means of thermal energy being supplied from the outside via the outer wall (8), can be transferred in a reversible manner between a thermally insulating, initial (Continued)

state, in which the working medium (11) is in the solid state and is in contact with the outer wall (6), and is not in contact with the inner wall (5), and a thermally conductive state, in which at least some of the working medium (11) is in the liquid state and has expanded and is in thermally conductive contact both with the outer wall (6) and with the inner wall (5). The invention also provides a method for controlling the temperature of food or of a beverage in a portable hand-held device.

12 Claims, 4 Drawing Sheets

(58) Field of Classification Search
CPC ............... A47J 41/0066; A47J 41/0072; A47J 41/0094; A47J 41/02; A47J 41/022; A47J 41/024; A47J 41/026; A47J 41/028; A47J 36/26; A47J 36/30; B65D 81/3841; B65D 81/3844; B65D 81/3872; B65D 81/3874; B65D 81/3846; B65D 81/3869; B65D 81/3881; B65D 81/3883; B65D 81/3886; B65D 81/38; A47G 19/2288
USPC ...... 220/568, 592.16, 592.17, 592.2, 592.27, 220/592.28, 577, 592.01, 592.21, 592.24, 220/592.26, 903
See application file for complete search history.

(56) References Cited

U.S. PATENT DOCUMENTS

| | | | | |
|---|---|---|---|---|
| 4,765,393 | A * | 8/1988 | Baxter | A47G 19/2288 165/47 |
| 5,125,391 | A | 6/1992 | Srivastava et al. | |
| 5,168,793 | A * | 12/1992 | Padamsee | A47J 31/0573 215/12.1 |
| 5,518,138 | A * | 5/1996 | Boffito | A47J 41/022 220/592.27 |
| 6,431,124 | B2 * | 8/2002 | Kwon | A47J 41/005 122/13.3 |
| 9,035,222 | B2 * | 5/2015 | Alexander | F25B 21/04 219/432 |
| 9,555,948 | B2 * | 1/2017 | Nemeth | B23K 31/02 |
| 2006/0219724 | A1 * | 10/2006 | Melnik | A47J 27/00 220/592.27 |
| 2008/0087674 | A1 | 4/2008 | Overgaard | |
| 2009/0283533 | A1 * | 11/2009 | Hemminger | B65D 47/0895 220/592.2 |
| 2013/0221013 | A1 * | 8/2013 | Kolowich | B65D 81/3872 220/592.17 |
| 2015/0052933 | A1 * | 2/2015 | Darrow | A47G 19/2288 62/457.1 |
| 2016/0265812 | A1 * | 9/2016 | Tsai | A47J 41/02 |
| 2016/0309932 | A1 * | 10/2016 | Sedlbauer | F28D 20/02 |

FOREIGN PATENT DOCUMENTS

| | | |
|---|---|---|
| JP | S54-30030 A | 3/1979 |
| JP | S54-65867 A | 5/1979 |
| JP | S64-23933 U | 2/1989 |
| JP | H3-41616 U | 4/1991 |
| JP | 11050776 A | 2/1999 |
| JP | 2014198532 A | 10/2014 |
| WO | WO-96/16526 A1 | 5/1996 |
| WO | WO-9724968 A1 | 7/1997 |

OTHER PUBLICATIONS

CN2691425Y translation, originally published Mar. 13, 2005 (Year: 2005).*

International Search Report (in English and German) and Written Opinion of the International Searching Authority (in German) issued in PCT/DE2017/1008780, dated Jan. 10, 2018; ISA/EP.

Japanese Office Action from counterpart JP2019541846, dated Aug. 18, 2022.

* cited by examiner

PORTABLE HAND-HELD DEVICE FOR ACCOMMODATING AND TRANSPORTING FOOD OR A BEVERAGE AND METHOD FOR CONTROLLING TEMPERATURE

CROSS REFERENCE TO RELATED APPLICATIONS

This application is a U.S. National Phase Application under 35 U.S.C. 371 of International Application No. PCT/DE2017/100878 filed on Oct. 16, 2017, which claims the benefit of priority from German Patent Application No. 10 2016 012 323.0 filed Oct. 17, 2016. The entire disclosures of all of the above applications are incorporated herein by reference.

The invention relates to a portable hand-held device for accommodating and transporting food or a beverage and a method for controlling temperature.

BACKGROUND

Such hand-held devices are used to accommodate food or beverages and to transport them. The hand-held device comprises a thermally insulated container as well as a container closure, which is suitable for closing a container opening of the thermally insulated container. Such portable hand-held devices include, for example, thermoses and thermos flasks or cooking utensils equipped with a thermally insulated container.

From US 2006/0219724 A1, a cooking utensil is known, which comprises a thermally insulated container, wherein a working medium is arranged in an insulating space which is formed between an inner and an outer wall as an evacuated and sealed space. The working medium is located at the base of the outer wall in the insulating space. If heat is supplied from the outside, the working medium changes into a gaseous state in such a way that gas particles rise within the insulating space reaching into the lateral region of the insulating space between the inner and outer wall. The gas particles make a heat transfer between the outer and inner wall possible. If the thermal-energy supply is switched off again, the gas particles condense.

Another cooking utensil with an inner and an outer pot and a space formed therebetween is disclosed in document WO 96/16526 A1. In the case of supplying heat from the outside, thermal bridges are formed in the space between the inner and the outer pot, which make heat transfer towards the inner pot possible. The formation of thermal bridges takes place in an irreversible manner.

SUMMARY

The object of the invention is to provide a portable hand-held device for accommodating and transporting food or a beverage and a method for controlling temperature, using which heating of the food or of the beverage in a thermally insulated container, as well as thermally insulating the food or the beverage are made possible in an efficient manner in the case of the portable hand-held device.

The object is solved by means of a portable hand-held device for accommodating and transporting food or a beverage according to independent claim 1 as well as a method for controlling the temperature of food or a beverage in a portable hand-held device according to independent claim 15. The subject matter of dependent claims relates to alternative embodiments.

According to one aspect, a portable hand-held device for accommodating and for controlling the temperature of food or a beverage is created, which comprises a thermally insulated container and a container closure which is set up to close a container opening of the thermally insulated container. The thermally insulated container is set up to accommodate food or a beverage in an accommodating space. The thermally insulated container comprises an inner and an outer wall enclosing the accommodating space, as well as an insulating space arranged therebetween, which is of closed and sealed design and is evacuated. In the insulating space, there is a working medium arranged, which, by means of thermal energy being supplied from the outside via the outer wall, can be transferred in a reversible manner between a thermally insulating initial state, in which the working medium is in a solid state and is in physical contact with the outer wall and is not in physical contact with the inner wall, and a thermally conductive state, in which at least a part of the working medium is in a fluid state and has been expanded and is in physical contact with both the outer wall as well as the inner wall.

According to another aspect, a method for controlling the temperature of food or of a beverage in a portable hand-held device is created. In the case of the method, a good to be temperature-controlled and pertaining to food or a beverage is provided in an accommodating space of a thermally insulated container. The thermally insulated container comprises an inner and an outer wall enclosing the accommodating space as well as an insulating space arranged therebetween, which is of closed and sealed design and has been evacuated. A container closure is provided, which is set up to close a container opening of the thermally insulated container. In the case of the method, thermal energy is provided by means of a heating device. The thermal energy is transferred onto the outer wall of the thermally insulated container. The good to be temperature-controlled is heated by means of the thermal energy, wherein, here, a working medium, which is arranged in the insulating space, is heated by means of the thermal energy. By means of this, the working medium is transferred in a reversible manner out of a thermally insulating initial state into a thermally conductive state. In the thermally insulating initial state, the working medium is in a solid state and in physical contact with the outer wall and is not in physical contact with the inner wall. In the thermally conductive state, at least a part of the working medium is in a fluid state and has been expanded, and is in physical contact with both the outer wall, as well as the inner wall, whereby the thermal energy is transferred by means of heat conduction from the outer wall to the inner wall via the fluid working medium and from there to the good to be heat-controlled.

It can be provided that the working medium is, by means of supplying thermal energy from the outside via the outer wall in a reversible manner between a thermally insulating initial state, in which the working medium is in a solid state and in physical contact with the outer wall, arranged at least in the region of a base of the outer wall and not in physical contact with the inner wall, and that it can be transferred to a thermally conductive state, in which at least one part of the working medium is in a liquid state and expanded and is in heat-conductive contact with both the base of the outer wall as well as the inner wall, at least in the region of a base of the inner wall.

The container closure can be designed as a thermally insulating closure, in order to also support the thermally insulating effect of the thermally insulated container in the closure region in this way. The container closure can be screwably or pivotably arranged on the thermally insulated container. In addition or as an alternative, a frictional connect can be provided if the container closure is arranged in the container opening in order to close the thermally insulated container. This may relate to a removable cover.

The outer wall of the thermally insulated container can form the outer wall of the portable hand-held device.

In the thermally conductive state, the heat transfer of the supplied thermal energy from the outer wall to the inner wall via the fluid working medium and from there to the food or the beverage, which can be heated in this manner, takes place. The expansion and the transition into the fluid state for the working medium are reversible so that, in the case of ending the supply of thermal energy, the working medium passes back into the solid state and, hereby, the heat-conductive contact to the inner wall is interrupted again. The working medium passes back into the thermally insulating initial state. The heated state of the food or of the beverage is now thermally insulated by means of the thermally insulated container.

The working medium can be a material from the following group: paraffin and paraffin derivative. The working medium can additionally contain one or a plurality of fillers, which support the heat conduction of the working medium in the fluid state, for example titanium swarfs. A filler can also support the expansion of the carrier material, for example, "hollow glass spheres", as they are available, for example, from the company Hollowlite. Furthermore, a filler can be provided in order to lower the vapour pressure of the working medium or keep it at a low level.

The thermally conductive state of the working medium creatable by supplying thermal energy is established if the working medium is at least partially in a fluid state and the working medium is in physical contact with both the inner wall as well as the outer wall.

The thermally insulated container can comprise a coating of a thermally insulating material, for example, of a plastic material such as silicone, on the outer wall.

In the thermally conductive state, the working medium can be in physical contact with the base of the inner wall and side wall sections of the inner wall abutting thereon as well as with the base of the outer wall and side wall sections of the outer wall abutting thereon. In the region of the side wall sections of the inner and/or the outer wall, the physical contact of the fluid working medium can be limited to the side wall sections directly abutting the base in the edge region.

In the thermally conductive state, the physical contact of the working medium can be limited to the base of the inner wall and the base of the outer wall. The physical contact is limited in this manner to the contact between the both bases.

In the thermally conductive state, the physical contact of the working medium can be designed to completely cover the base of the inner wall and/or the base of the outer wall. As an alternative, the physical contact of the working medium in the thermally conductive state can cover only a partial region of the base of the inner wall and/or only a partial region of the base of the outer wall.

In the thermally conductive state, the insulating space can essentially be free of working medium in a gaseous state. Both in the thermally conductive state, as well as in the thermally non-conductive solid state, the insulating space can essentially be free of working medium in the gaseous state. In this way, a contamination of the evacuated insulating space can be avoided.

The inner and outer wall can be made out of a material from the following group: metal, glass, and plastic. Heat-resistant materials can be used that are resistant against supplying thermal energy onto the outer wall. The supply of the thermal energy can result as far as in cooking the food or boiling the beverage in the accommodating space. The wall of the thermally insulated container can be made of one or a plurality of compatible materials, in particular, making material bonding possible, which allows for the sealed and evacuated formation of the insulating space.

The outer wall can at least portionally comprise a wall material on the base with a higher heat transfer coefficient than another material which is different from the wall material in the region outside of the base of the outer wall. In addition or as an alternative, such an embodiment can be provided for the inner wall. The different heat transfer coefficients can be formed by means of using different materials. In addition or as an alternative, a coating can be provided inside or outside on the corresponding wall section, said coating being used to form a different heat transfer behaviour. For example, it can be provided that the outer wall in the base absorbs heat and transfers it more efficiently, meaning within a region in which the working medium is arranged at least in the thermally insulating state. Heat- and/or fire-resistant materials can be used.

The base of the outer wall and/or the base of the inner wall can have surface-enlarging wall structures. The surface-enlarging wall structures can comprise one or a plurality of base depressions and/or one or a plurality of wall projections. The wall structures can accordingly form a regular arrangement. For example, the base and the outer wall can comprise depressions extending from the centre radially towards the outside which are circumferentially arranged with identical or different distances from one another.

In the thermally insulating state, at least one part of the working medium can be accommodated in the surface-enlarging wall structures. In the thermally insulating state, at least one part of the working medium can be arranged in the depressions of the surface-enlarging wall structures. If the thermally insulated container pertains to an upright container, the fluid working medium is accumulated in the depressions automatically after ending the thermal-energy supply from the outside due to gravitational force and passes again into the solid state, wherein the depressions can be set up to provide an even distribution of the working medium accumulating at the base. In an embodiment, the "connected vessels" principle can be used.

A heating device can be arranged on the thermally insulated container, which is set up to supply thermal energy to the working medium via the outer wall in order to carry the working medium out of the thermally insulating state into the thermally conductive state and to heat the food or the beverage within the accommodating space. The heating device can be set up to provide thermal energy as far as to cooking the food or boiling the beverage within the accommodating space. For example, an electrical heating device or a gas-burning heating device can be provided. A solid-fuel burning device can be provided as well, for example for burning a fuel capsule. The heating device can be arranged on the thermally insulated container in a detachable manner. The heating device can be accommodated on the thermally insulated container in such a way that a single portable hand-held device is formed. For example, a thermally insulated container and a heating device can form a portable thermos or thermos flask.

The heating device can be arranged on the thermally insulated container in a positive-locking manner. In the case of arranging the heating device on the thermally insulated container in a positive-locking manner, it can be provided that the surface-enlarging wall structures engage into the associated surface structures on the heating device in a positive-locking manner. The positive-locking fit can be partially or fully established.

The heating device can be arranged on the thermally insulated container in the region of the base of the outer wall. The heating device can be screwed to the thermally insulated container and/or be attached by means of a click closure. Alternatively or in addition, a plug connection can be provided.

A control device can be provided that is intended to control the heating device during operation. In particular, the control of the heating device takes place if it generates the thermal energy to be supplied. The control can comprise a control of the thermal-energy output. A switch-on and/or switch-off point in time can be controlled for the heating device by means of the control device, for example, by means of a trigger impulse. Here, a programmable control device can be concerned. The control device can couple to a transceiver, which makes at least the reception of the control signals possible for a remote control. For example, such a remote control can be executed with the aid of a software application, which is installed on a mobile computer or a mobile telephone. It can be provided that control information is transmitted by the control device once or a several times during operation, which provides information concerning the current operational state or control state. In combination with such a remote control or also without this, it can be provided that the control device is programmable in order to configure a heating process. For this purpose, user input can be captured by means of the control device.

A sensor device can be provided which functionally pairs with the control device and the control device is set up to control the heating device depending on sensor signals of the sensor device. The sensor device can be set up to capture operating parameters for the accommodating space of the thermally insulated container, for example, pressure and/or temperature. The sensor device can be arranged in and/or on the accommodating space in such a way that the desired operating parameters can be measured. The sensor signals captured in this manner can be transmitted to the control device, whether it be wire-bound or wireless, in order to process these there so that the operation of the heating device can be controlled. A tilt sensor can be provided which is set up to allow or block an operation of the heating device depending on position. For example, an operation of the heating device can be prevented in this manner if the latter shows that the thermally insulated container is lying on its side, whereas the tilt sensor allows switching on the heating device if the thermally insulated container is in an upright position.

A getter can be arranged in the insulating space. This relates to a chemically reactive material which is used to maintain a vacuum for the longest extent possible.

A gripping device can be arranged on the thermally insulated container on the outside, for example, on an outer shell, which has a gripping section that is formed as a thermally insulated grip.

A pressure cooker can be provided with the portable hand-held device.

In terms of the present description, the base, with which the working medium in the various states is in physical contact or comes into physical contact, is the part of the wall of the container, on which the heating device emits thermal energy. In an embodiment, this need not necessarily coincide with a standing surface formed on a thermally insulated container, however, it can.

In connection with the method to control the temperature of food or a beverage in a portable hand-held device, the preceding explanations for the portable hand-held device apply correspondingly. In the case of the method, it can be provided that, after heating the good to be temperature-controlled, the supply of energy is stopped, whereby the fluid working medium passes back into the solid state. Thereby, the physical contact of the liquid working medium established in the thermally conductive state with the inner wall is interrupted again so that the thermally insulating state is established again.

DESCRIPTION OF EXEMPLARY EMBODIMENTS

In the following, other exemplary embodiments are explained taking figures of a drawing into consideration. The figures show.

Figure 1:
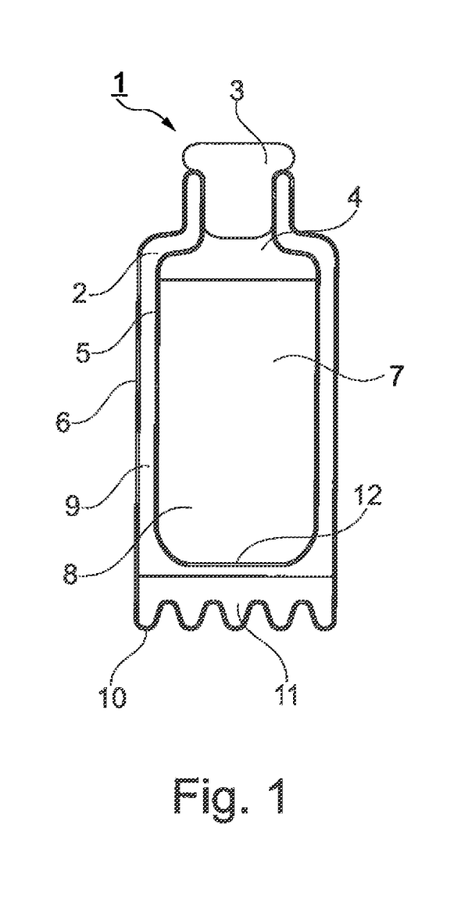
FIG. 1 a schematic cross-sectional illustration of a portable hand-held device with a thermally insulated container, wherein a working medium is in a thermally insulating state.
Figure 2:
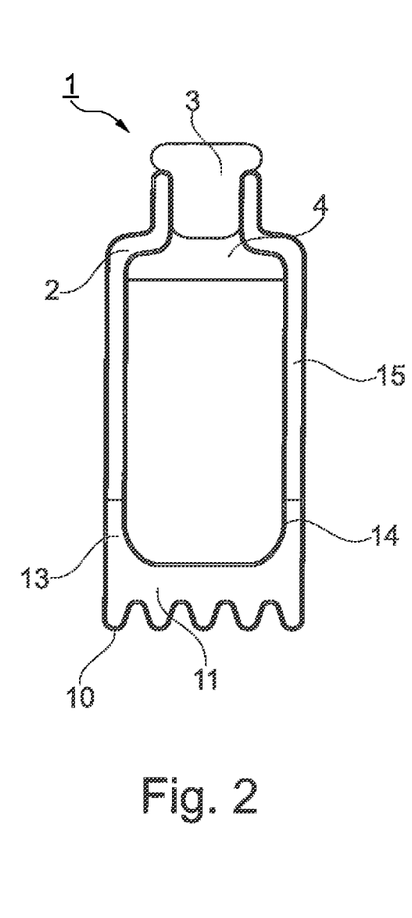
FIG. 2 a schematic cross-sectional illustration of the portable hand-held device in FIG. 1, wherein the working medium is in a liquid state and in an expanded thermally conductive state.
Figure 3:
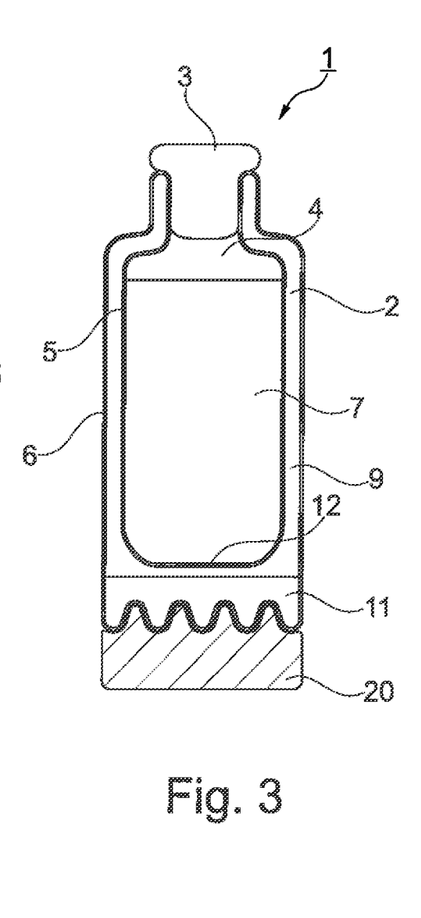
FIG. 3 a schematic cross-sectional illustration of the portable hand-held device in FIG. 1, wherein the working medium is now again in the thermally insulating initial state.

FIGS. 1 to 3 show schematic cross-sectional illustrations of a portable hand-held device 1 with a thermally insulated container 2 and a container closure 3, which closes a container opening 4 of the thermally insulated container 2. A thermos or a cooking utensil can be provided with the portable hand-held device 1 for example.

In the case of the thermally insulated container 2, an inner and an outer wall 5, 6 enclose an accommodating space 7, in which a liquid or solid good 8 to be temperature-controlled is accommodated, for example, food or a beverage.

The inner and outer wall 5, 6 enclose an insulating space 9, which is of closed and sealed design, having been evacuated. By means of the evacuation, a vacuum is established, as is known as such for thermally insulated containers or Dewar vessels.

In accordance with FIG. 1, a working medium 11 in a solid state is arranged at the base 10 of the outer wall 6, wherein, in the illustration shown, the working medium 11 is arranged covering the base 10 of the outer wall 6 completely. In FIG. 1, the working medium 11 in the thermally insulating state is in physical contact with the base 10 of the outer wall 6. However, the working medium 11 is spaced from a base 12 of the inner wall 5, i.e., not in physical contact.

In order to heat the good 8 to be temperature-controlled in the accommodating space 7, thermal energy is supplied from the outside onto the outer wall 6 so that the working medium 11 is liquefied in accordance with FIG. 2 and expands with regard to its volume so that a contact is now established with the base 12 of the inner wall 5. In the case of the exemplary embodiment shown, the contact extends into the region of the side wall sections 13, 14, which directly abut the base 12 of the inner wall 5 and the base 10 of the outer wall 6. As an alternative, the contact can be limited to the region of the bases 10, 12, wherein these can be partly or fully covered by the contact.

Within the region of the side wall sections 13, 14, a partition wall (not shown) can be provided, which separates a lower partial space in the insulating space 2, which accommodates the working medium, and an upper partial space, which is free of the working medium 11. Both partial spaces are evacuated; as an alternative, also only one of the partial spaces. The partition wall can extend horizontally in the insulating space 2 between the inner wall 5 and the outer wall 6. The partition wall can be impermeable for the working medium 11. The partition wall, the provision of which is not limited to the exemplary embodiments shown in the figures, can be designed with a collar.

A region 15 above the liquefied 11 remains free of the working medium 11. Via the contact, which is established for the working medium 11 between the inner and the outer wall 5, 6, now the thermal energy from the outside via the outer wall 6 can be transmitted to the inner wall 5, and from there, to the good 8 to be temperature-controlled ranging as far as to cooking the good 8 to be temperature-controlled.

If the heating process has ended, the thermal-energy supply ends. After this, in accordance with FIG. 3, the working medium 11 passes back into the thermally insulating initial state again, in which the working medium 11 is arranged in the solid state and on the base 10 of the outer wall 6 without being in contact with the base 12 of the inner wall 5. In this state, the evacuated insulating space 9 can fully unfold its thermally insulating effect again.

For example, the following materials are used as a working medium 11: paraffin or paraffin derivative.

In FIG. 3, a heating device 20 is schematically shown which is set up to generate thermal energy and, in the exemplary embodiment shown, to emit the thermal energy at the base 10 of the outer wall 6.

Figure 4:
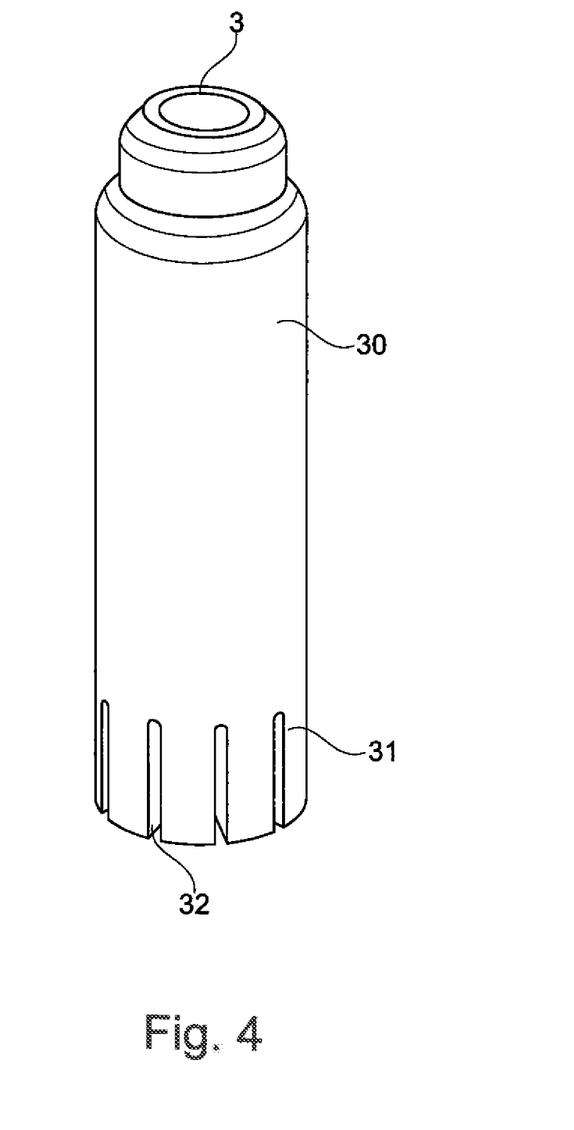
FIG. 4 a perspective schematic illustration of a thermally insulated container.
Figure 5:
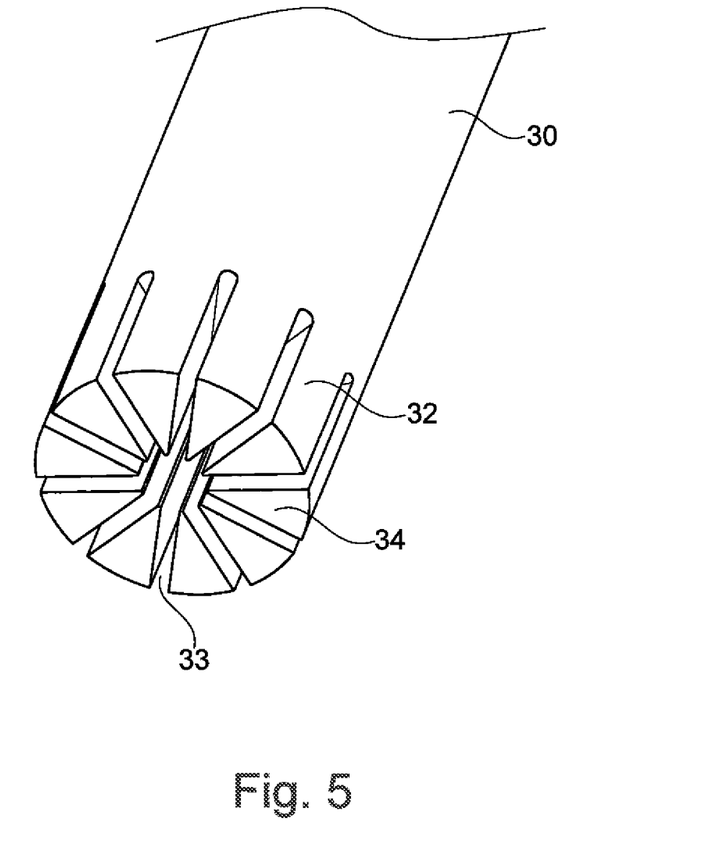
FIG. 5 another partial perspective illustration of thermally insulated container in FIG. 3.
Figure 6:
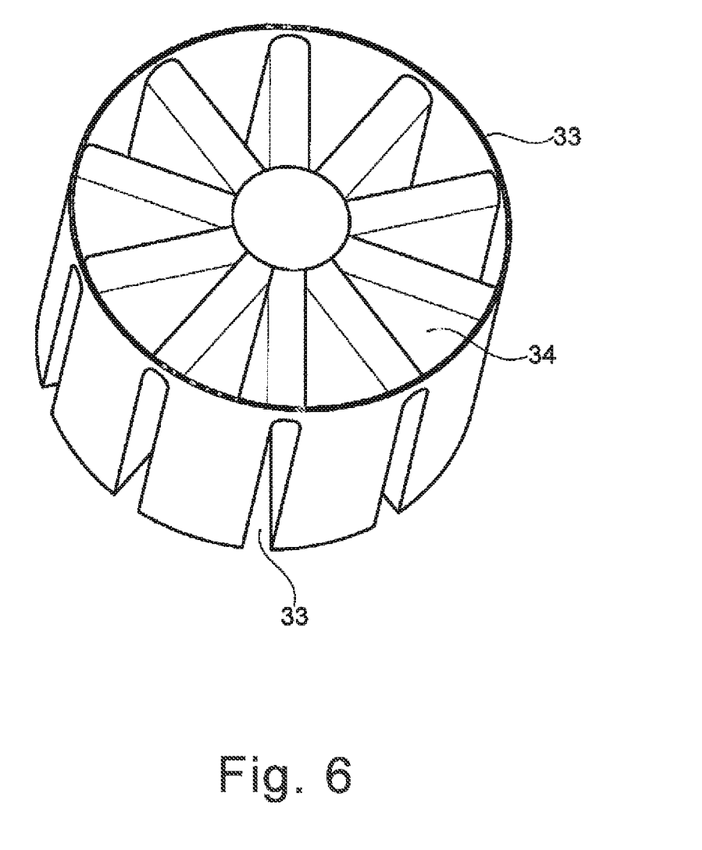
FIG. 6 a perspective illustration of the base section of the thermally insulated container.

FIGS. 4 to 6 show schematic illustrations of an embodiment of a double-wall thermally insulated container 30, which can be designed with the same characteristics as the thermally insulated container 2 in FIGS. 1 to 3 and which can be the component of a portable hand-held device. The thermally insulated container 30 comprises surface-enlarging wall structures 32 in the base region 31 (as is also the case in the embodiment in FIGS. 1 to 3), which form inner depressions 34 between wing-like recesses 33 (in the insulating space 9). If the thermally insulated container 30 is combined with a heating device (not shown), it can be provided that the former engages into the wall structures in a positive-locking manner.

The features of the invention described in the aforementioned description, the claims as well as the drawing can be of significance both individually, as well as in any combination for the implementation of various embodiments.

The invention claimed is:

1. A portable hand-held device for accommodating and transporting food or a beverage, comprising
 a thermally insulated container which is configured to accommodate the food or beverage having
 a base;
 an accommodating space;
 an inner and an outer wall as well as an insulating space arranged therebetween enclosing the accommodating space, wherein the insulating space is of closed and sealed design and evacuated;
 the outer wall having a lower wall section adjacent to the base and an upper wall section distal from the base, where the lower wall section is comprised entirely of a first wall material and the upper wall section is comprised entirely of a second wall material, such that the second wall material is different from the first wall material, and
 the first wall material is provided with a heat transfer coefficient higher than the heat transfer coefficient of the second wall material; and
 a container closure, which is set up to close a container opening of the thermally insulated container;
 wherein a working medium is arranged in the insulating space, which, by means of an external thermal energy being supplied to a side of the outer wall facing away from the insulating space, can be transferred in a reversible manner between,
 a thermally insulating initial state, in which the working medium is in a solid state and is in physical contact with the outer wall and is not in physical contact with the inner wall, and
 a thermally conductive state, in which at least a part of the working medium is in a fluid state and has expanded and is in thermally conductive contact with both the outer wall as well as the inner wall; and wherein the working medium is one of paraffin or a paraffin derivative.

2. The portable hand-held device according to claim 1, wherein, in the thermally conductive state, the working medium is in physical contact with a bottom of the inner wall and side wall sections of the inner wall abutting thereon as well as with a bottom of the outer wall and side wall sections of the outer wall abutting thereon.

3. The portable hand-held device according to claim 1, wherein, in the thermally conductive state, the physical contact of the working medium is limited to a bottom of the inner wall and a bottom of the outer wall.

4. The portable hand-held device according to claim 1, wherein, in the thermally conductive state, the insulating space is essentially free of working medium in a gaseous state.

5. The portable hand-held device according to claim 1, wherein the inner wall is made from a material selected from a group consisting of: metal, glass and plastic, and the first and second materials of the outer wall are made from a material selected from a group consisting of: metal, glass and plastic.

6. The portable hand-held device according to claim 1, wherein a bottom of the outer wall and/or a bottom of the inner wall comprise surface-enlarging wall structures.

7. The portable hand-held device according to claim 6, wherein, in the thermally insulating state, at least a part of the working medium is accommodated in the surface-enlarging structures.

8. The portable hand-held device according to claim 1, further comprising a heating device configured to engage the thermally insulated container, wherein said heating device is configured to supply thermal energy to the working medium via the outer wall.

9. The portable hand-held device according to claim 8, wherein the heating device engages the thermally insulated container in a positive-locking manner.

10. The portable hand-held device according to claim 8, wherein the heating device engages the thermally insulated container in a region of the outer wall.

11. The portable hand-held device according to claim 8, further comprising a control device configured to control the heating device during operation.

12. The portable hand-held device according to claim 11, further comprising a sensor device configured to send signals to the control device, and wherein the control device is configured to control the heating device based on signals received from said sensor device.

\* \* \* \* \*